United States Patent [19]

Young et al.

[11] Patent Number: 4,585,624
[45] Date of Patent: Apr. 29, 1986

[54] PARAFORMALDEHYDE GAS GENERATOR FOR FUMIGATING ANIMAL HOUSES

[76] Inventors: Galen F. Young, Box 353, R.D. #3, Manheim, Pa. 17545; Bernell E. Swords, 2863 E-Town Rd., Elizabethtown, Pa. 17022

[21] Appl. No.: 673,240

[22] Filed: Nov. 19, 1984

[51] Int. Cl.$^4$ ................................................ B01J 7/00
[52] U.S. Cl. .................................... 422/305; 422/27; 422/123
[58] Field of Search ................ 422/4, 5, 27, 123, 125, 422/305

[56] References Cited

U.S. PATENT DOCUMENTS

| | | | |
|---|---|---|---|
| 558,258 | 4/1896 | Colson | 422/125 X |
| 586,759 | 7/1897 | Cock | 422/305 |
| 653,680 | 7/1900 | Kingzett | 422/305 X |
| 665,794 | 1/1901 | Melzer . | |
| 996,399 | 6/1911 | Calkins | 422/305 |
| 1,038,546 | 9/1912 | Fernekes | 422/305 X |
| 1,299,309 | 4/1919 | Durand et al. | 422/305 X |
| 1,837,264 | 12/1931 | Hackley . | |
| 2,993,832 | 7/1961 | Kaitz . | |
| 3,694,146 | 9/1972 | Roy et al. . | |
| 3,816,074 | 6/1974 | Decupper . | |
| 3,898,038 | 8/1975 | Anderson . | |
| 4,166,087 | 8/1979 | Cline et al. . | |

Primary Examiner—Robert Lindsay
Attorney, Agent, or Firm—Harvey B. Jacobson

[57] ABSTRACT

A gas generator to produce formaldehyde gas in enclosed spaces such as animal houses or for conveying such gas to inaccessible areas through a flexible hose which includes a base and hood mounted thereon. The base is in the form of an open topped container having a heating element oriented under the bottom wall thereof and in heat exchange relation to water and paraformaldehyde flakes or formalgen powder in shallow compartments interiorly of the container for producing formaldehyde gas and water vapor that is heated above ambient temperature. The container includes air inlet slots adjacent to but below the open top and below the lower edge of the hood which is supported on supporting ledge structures on the interior of the container whereby air is entrained into the upwardly moving gas and water vapor for mixing therewith and assisting in disseminating the gas into all areas of the enclosed space when the gas, moisture and air mixture is discharged from an opening in the upper end of the hood.

5 Claims, 6 Drawing Figures

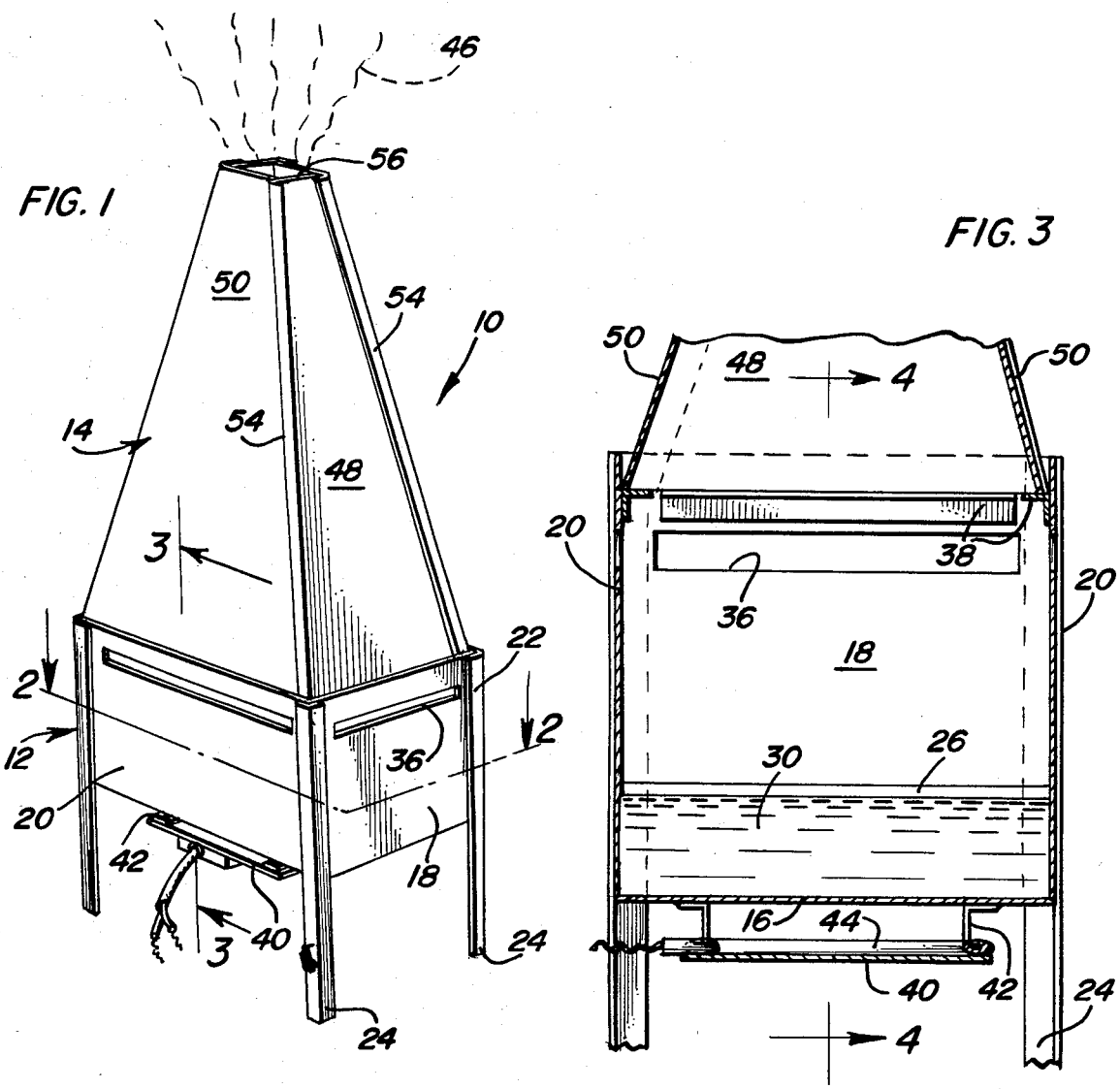
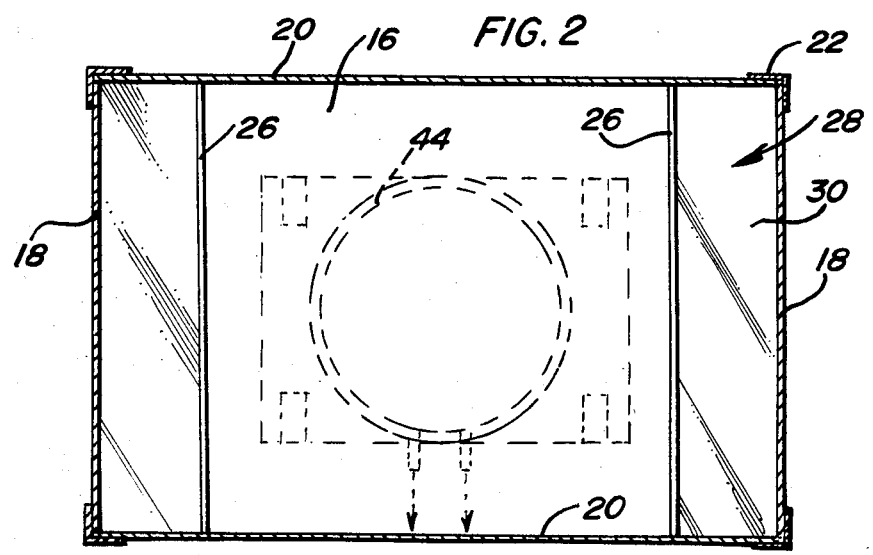

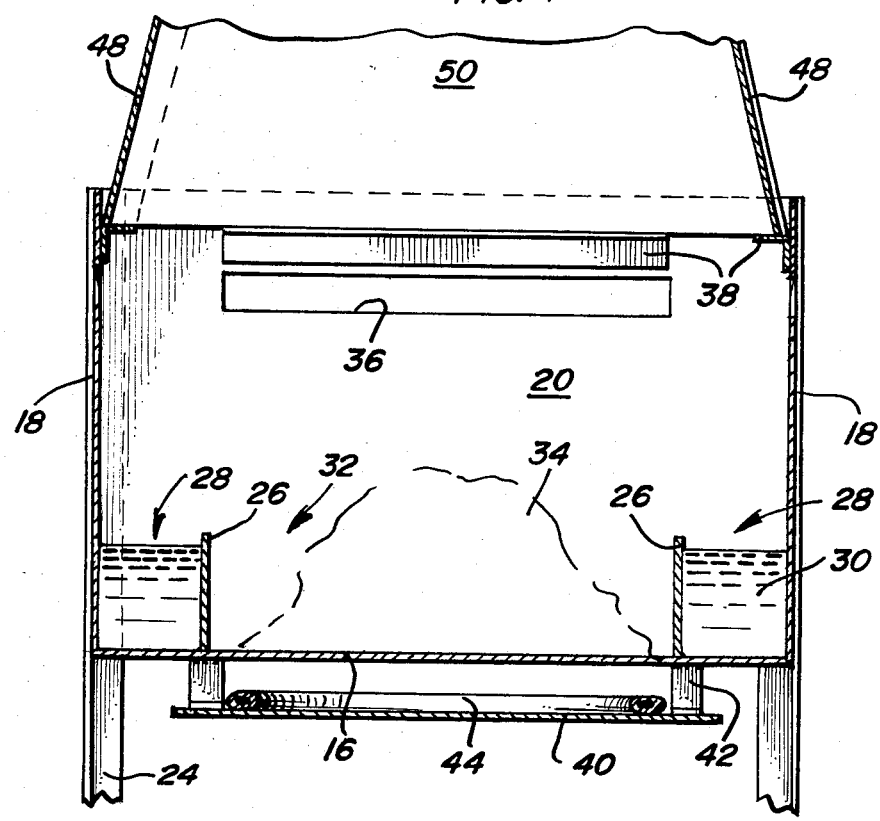
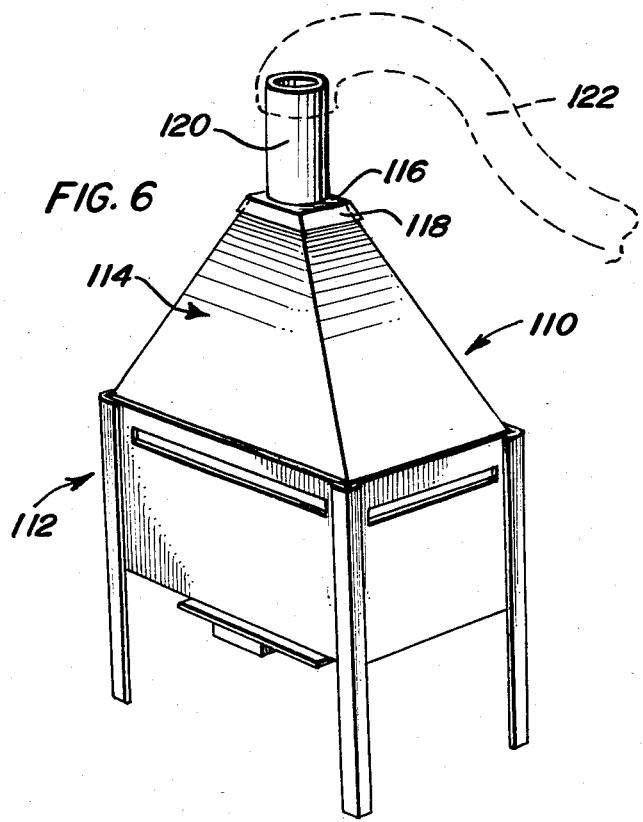
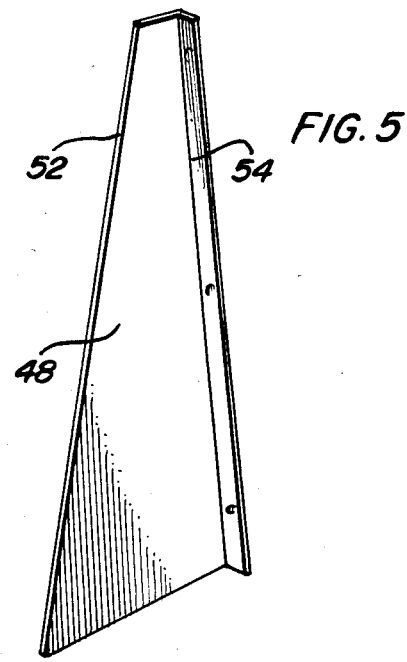

PARAFORMALDEHYDE GAS GENERATOR FOR FUMIGATING ANIMAL HOUSES

BACKGROUND OF THE INVENTION

1. Field of the Invention

The present invention generally relates to a gas generator for fumigating animal houses or other uses having a base divided into multiple compartments for holding water and gas producing materials such as paraformaldehyde flakes or the like with a heater element associated with the base for heating the flakes to release formaldehyde gas and heating the water to produce moisture or humidity mixed with the gas utilized in a more effective method of fumigating animal houses or the like. Two types of hoods are associated with the base so that air currents produced by the heated gas discharges the gas from the upper end of the hood without a fan or blower. The hoods are generally frustoconical in configuration with one embodiment of the hood including an open apex and the other embodiment of the hood including a tubular member for connection with a flexible pipe, hose or the like to enable the gas to be discharged into a desired area remote from the upper end of the hood. The base includes air inlet openings or vents to facilitate air circulation and discharge of the generated gas from the apex of the hood.

2. Description of Related Art

Devices for producing gas by heating a gas producing material are generally known with the following U.S. patents disclosing various developments in this field of endeavor.

| U.S. Pat. No. 665,794 | Melzer | 1/8/01 |
| U.S. Pat. No. 1,837,264 | Hackley | 12/22/31 |
| U.S. Pat. No. 2,993,832 | Kaitz | 7/25/61 |
| U.S. Pat. No. 3,694,146 | Roy et al | 9/26/72 |
| U.S. Pat. No. 3,816,074 | Decupper | 6/11/74 |
| U.S. Pat. No. 3,898,038 | Anderson | 8/5/75 |
| U.S. Pat. No. 4,166,087 | Cline et al | 8/28/79 |

While the above patents are relevant to this invention, they do not disclose the particular structure of the compartmented base with vent openings combined with a hood structure so that gas is generated in the base, mixed with humidity and disseminated from the hood without the use of a fan or blower.

SUMMARY OF THE INVENTION

An object of the present invention is to provide a gas generator for fumigating animal houses, feed bins, feed tanks, feed hauling truck bins or tanks, feed mills or other hard to reach areas in which the gas generator includes a compartmented base with at least one compartment containing paraformaldehyde flakes and at least one other compartment containing water with a heater associated with the compartments to generate formaldehyde gas and water vapor which is mixed with the formaldehyde gas and discharged from a hood assembly positioned on top of the base.

Another object of the invention is to provide a gas generator in accordance with the preceding object in which the base includes air vent openings in the vertical walls thereof so that air is entrained and mixed with the generated gas so that air currents produced by the heating unit will discharge the mixed gas, moisture and air from the upper end of the hood assembly into the interior of an animal house or a flexible hose may be connected to the upper end of the hood assembly for discharge of the generated gas to remote and generally inaccessible areas.

A further object of the invention is to provide a gas generator and a method of using the same in which the gas generators are located in an animal house or other enclosure in a predetermined spaced relation corresponding to the output capacity of the gas generator so that all of the interior space and interior surfaces of the enclosure will be fumigated in order to kill various viruses, bacteria or the like with the invention being particularly useful in animal houses such as those used for poultry, swine, turkeys or the like and also useful in not only sterilizing the animal houses but also feed storage areas and feed supply areas, trucks and the like.

Still another object of the invention is to provide a gas generator which is relatively simple in construction, easy to install in association with other gas generators and in association with an animal house or other enclosure with the gas generator including two types of hoods with one hood disseminating the gas into the interior of the animal house and the other type of hood having a hose connected thereto for discharge of the gas onto specific areas at a remote location.

These together with other objects and advantages which will become subsequently apparent reside in the details of construction and operation as more fully hereinafter described and claimed, reference being had to the accompanying drawings forming a part hereof, wherein like numerals refer to like parts throughout.

BRIEF DESCRIPTION OF THE DRAWINGS

FIG. 1 is a perspective view of the gas generator of the present invention.

FIG. 2 is a transverse, top plan sectional view of the base of the gas generator taken along section line 2—2 on FIG. 1.

FIG. 3 is a vertical sectional view, taken substantially upon a plane passing along section line 3—3 on FIG. 1 illustrating further structural details of the invention.

FIG. 4 is a vertical sectional view taken substantially upon a plane passing along section line 4—4 on FIG. 3 illustrating still additional details of the structure of the gas generator of this invention.

FIG. 5 is a perspective view of one segment of the hood.

FIG. 6 is a perspective view of an alternative form of the hood.

DESCRIPTION OF THE PREFERRED EMBODIMENTS

Referring now specifically to the drawings, the gas generator illustrated in FIGS. 1-5 is generally designated by numeral 10 and includes a base generally designated by the numeral 12 and a hood generally designated by the numeral 14. The base 12 inlcudes a bottom wall 16 of rectangular configuration and two opposite end walls 18 and two opposite side walls 20 all of which are one piece unitary construction with the end walls 18 being parallel to each other and the side walls 20 being parallel to each other with both the end walls and side walls being perpendicular to the bottom wall 16 and forming continuations thereof thereby forming an open topped base with the interior thereof being hollow. The vertical side edges of the end walls 18 and side walls 20 are joined together by and sealed by a corner member 22 which is in the form of an elongated angle member having the upper end flush with the upper end of the walls 18 and 20 and the lower end projecting substantially below the bottom wall 16 to form supporting legs 24 in order to elevate the bottom wall 16 above a supporting floor surface or the like.

Positioned interiorly of the base 12 is a pair of transversely extending partition members which are parallel to the end walls 18 as illustrated in FIGS. 2 and 4 and spaced therefrom and spaced from each other with the space between the partition members 26 being substantially larger than the space between the partition members 26 and the corresponding end walls 18. Also, the partition members 26 extend for only a portion of the vertical heighth of the end walls 18 and side walls 20 thus providing two end compartments 28 for receiving water 30 which may be poured into the compartments 28 through the open end of the base 12. Between the partition members 26, a compartment 32 is provided for receiving a quantity of crystals or flakes 34 of paraformaldehyde or formalgen powder as illustrated in FIG. 4.

Each end wall 18 and side wall 20 is provided with a horizontally disposed elongated air vent 36 in the form of a generally rectangular slot adjacent to but spaced below the upper edge of the respective walls. Also, each end wall 18 and each side wall 20 is provided with a right angular support bracket 38 parallel to but spaced below the upper edge of the corresponding walls with the brackets 38 being aligned with and oriented immediately above the air vents 36 as illustrated in FIGS. 3 and 4 with each of the brackets 38 including a horizontal flange which extends inwardly from the corresponding wall to provide a supporting ledge for the hood 14 so that the lower edge of the hood 14 is telescoped into the upper end of the base 12 and supported by the brackets 38 so that the lower edge of the hood 14 is spaced above the air vents or slots 36 as illustrated in FIGS. 3 and 4.

Positioned below the bottom wall 18 and extending at least under the central compartment 32 is a support wall or bracket 40 attached to the bottom wall 16 by bracket straps 42 at the corners thereof with the support plate or bracket 40 providing a support for a heating element 44 which is placed under the central compartment 32 but extends to the periphery thereof so that the heating element 44 will not only heat the gas producing material 34 but also heat the water 30 to produce water vapor in the interior of the base 12 for mixing with the gas produced by the gas producing material 34 when it is heated for mixing the moisture with the gas. Also, air will be entrained in through the air vents 36 for mixing with the gas and moisture for discharge upwardly through the hood 14 with the discharged material being designated by numeral 46 in FIG. 1.

The hood 14 is generally pyramidal in configuration and provided with end panels 48 and side panels 50 each of which includes upwardly converging side edges 52 one of which is provided with a flange 54 perpendicular to the panel so that the flanges 54 will overlap the corresponding edge of an adjacent panel and be secured thereto by rivets, spot welding or the like thereby providing a generally rigid pyramidal hood with the plan cross sectional configuration being generally rectangular with the lower end of the hood 14 telescoping into the open upper end of the base 12 with the lower edges of the panels 48 and 50 resting against the horizontal flange on the brackets 38 as illustrated in FIGS. 3 and 4 so that the hood may be easily placed in position and removed when desired to enable replenishment of the paraformaldehyde flakes or similar gas generating material 34 and also to replenish the supply of water 30 in the compartments 28. A suitable handle may be attached to the hood to facilitate handling if desired. The upper end of the hood defines a discharge opening 56 of generally rectangular or square configuration so that the gaseous mixture 46 may easily discharge from the hood 14 into the interior of an animal house or other enclosure in which the gas generator 10 is placed.

The gas generator 110 illustrated in FIG. 6 includes the same base 112 as that illustrated in FIGS. 1–5 and the hood 114 is very similar except that the heighth of the hood 14 in FIGS. 1–5 is substantially greater than the hood 114. In FIG. 6, the hood 114 is provided with an adapter 116 overlying and forming a closure for the opening at the upper end of the hood 114 with the adapter 116 including downwardly inclined edge flanges 118 which telescope over and rest on the end and side panels forming the hood 114. Centrally of the adapter 116 is a tubular pipe 120 projecting upwardly therefrom and having an open upper end for telescopically receiving one end of a flexible hose 122 so that the gas generated by the gas generator can be conveyed to and discharged at a remote location in order to enable the gas to be discharged into inaccessible areas and onto inaccessible surfaces.

The gas generator is so constructed that it can be made of various sizes with a minature gas generator being provided for relatively small volume spaces and larger gas generators being provided for larger volume areas.

In a typical installation in a poultry house, gas generators centrally located on the floor of the poultry house at 75 foot intervals have been successively used. Conventional power supply boxes, circuit breakers, and extension wires or cords of adequate capacity are provided with the power supply preferably being 220 volts AC although 110 volts AC can be utilized and a DC power supply may also be utilized to enable the unit to be used in mobile equipment. In the installation of the gas generators in a poultry house or similar enclosure, a control panel is provided at the doorway in order to activate or de-activate the gas generators at the doorway thereby eliminating the necessity of an attendant being subjected to the gas generated by the generator. In broiler houses, shavings are usually placed on the floor with the gas generators of the present invention being placed on the floor with three gas generators being normally connected to an electrical supply line although the number of generator units may be varied depending upon the broiler house being provided with one or two floors and depending upon the size of the broiler house.

By using the specially designed hood illustrated in FIG. 6, feed tanks outside the building can be fumigated when used with a special hose adapter to sterilize the feed tank when it is empty. Also, feed bins can be sterilized when they are empty with plastic sheeting or other covers being provided over the tanks or bins when fumigating. Similar arrangements can be used in sterilizing cage houses. Substantially any animal house used in various industries can be fumigated by utilizing the has generators and utilizing any required plastic sheeting or closures covering exhaust fans and other leakage areas which may exist in the building structure.

In actual tests, the gas generator of the present invention when associated with other gas generators or when used with the hose have been found effective in killing reo virus, merrick's virus and avian influenza. The use of the gas generator or gas generators substantially completely eradicates all viruses and bacteria from the structure of the house, bin, tank or the like due to the circulation of the gas for three to four hours with this length of "burn time" or "administration time" depending of course, upon the quantity of paraformaldehyde flakes or formalgen powder placed in each gas generator in order to adequately fumigate the volume of the space in which the gas generator is used.

As indicated, the size of the gas generator, the special relationship of adjacent gas generators and the capacity of each gas generator may be varied. In one practical unit, the heighth of the base is 22 inches, the heighth of the walls 12 inches with the base being 12 inches wide and 18 inches long. The hood in FIGS. 1-5 may be 40 inches long with the top opening 4 inches square. The hood in FIG. 6 may be 15 inches long and the adapter 10 inches high with the tubular pipe being 4 inches in diameter and the opening in the upper end of the hood being 4 inches square. The brackets for the hood are 10 inches long on the end walls and 14 inches long on the side walls with the slots being the same length and one inch in width. In this unit, the heating element is 220 volts and 1760 watts with the electrical breaker boxes and receptacles being in compliance with standard electrical codes.

The foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as new is as follows:

1. A gas generator comprising a base and a hood positioned on top of the base with the hood including an opening at the upper end portion thereof for discharging gas therefrom, said base including an open topped container having a plurality of compartments, each of the compartments being open at the top with at least one of the compartments receiving a gas generating material when heated and at least one of the compartments receiving water for producing water vapor when heated for mixing with the gas, a heating unit positioned under the container for heating the contents thereof, an air vent means in the container above the compartments and below the upper end thereof for admitting air for circulation up through the hood and mixing with the gas and water vapor for discharge from the opening in the hood, said container being defined by a bottom wall oriented generally horizontally and generally vertically extending peripheral walls forming a generally parallelopiped container and supporting legs attached to the container and extending below the container for supporting the bottom wall above a supporting surface, said heating unit being attached to and supported from the underside of the bottom wall, said compartments being defined by transverse partition members extending between opposed peripheral walls with the partition members being spaced from each other and having a heighth substantially less than the heighth of the peripheral walls, said partition members dividing the lower portion of the interior of the container into three compartments with a large central compartment and two smaller end compartments with the end compartments receiving water and the central compartment receiving material for producing formaldehyde gas when heated, said air vent means including a horizontally elongated, vertically narrow slot in each of the peripheral walls of the container with the slot being located adjacent to but spaced below the upper end of the container.

2. The structure as defined in claim 1 wherein said hood is generally pyramidal in construction and having a lower end telescoped into the open top of the base with the opening being defined by the top edge of the side panels of the hood.

3. The structure as defined in claim 2 wherein each wall of the container includes in inwardly extending bracket located above the air vent slots but below the top edge of the walls to form ledges for supportingly engaging the lower edge of the hood.

4. A gas generator comprising a base and a hood positioned on top of the base with the hood including an opening at the upper end portion thereof for discharging gas therefrom, said base including an open topped container having a plurality of compartments, each of the compartments being open at the top with at least one of the compartments receiving a gas generating material when heated and at least one of the compartments receiving water for producing water vapor when heated for mixing with the gas, a heating unit positioned under the container for heating the contents thereof, an air vent means in the container above the compartments and below the upper end thereof for admitting air for circulation up through the hood and mixing with the gas and water vapor for discharge from the opening in the hood, said container being defined by a bottom wall oriented generally horizontally and generally vertically extending peripheral walls forming a generally parallelopiped container and supporting legs attached to the container and extending below the container for supporting the bottom wall above a supporting surface, said heating unit being attached to and supported from the underside of the bottom wall, said compartments being defined by transverse partition members extending between opposed peripheral walls with the partition members being spaced from each other and having a heighth substantially less than the heighth of the peripheral walls, said partition members dividing the lower portion of the interior of the container into three compartments with a large central compartment and two smaller end compartments with the end compartments receiving water and the central compartment receiving material for producing formaldehyde gas when heated, said air vent means including a horizontally elongated, vertically narrow slot in each of the peripheral walls of the container with the slots being located adjacent to but spaced below the upper end of the container, said hood being generally pyramidal in construction and having a lower end telescoped into the open top of the base with the opening being defined by the top edge of the side panels of the hood, each peripheral wall of the container including an inwardly extending bracket located above the air vent slots but below the top edge of the walls to form ledges for supportingly engaging the lower edge of the hood, each wall of the pyramidal hood being formed by a panel having converging side edges with one side edge of each panel including a flange extending perpendicular to the panel so that the flange will overlap the edge of an adjacent panel for securement thereto to provide an upwardly tapering hood.

5. The structure as defined in claim 4 together with an adapter mounted on the upper end of the hood in closing relation to the opening therein, said adapter including an upwardly extending tubular member in communication with the interior of the hood and receiving a flexible hose to enable the gas generated to be discharged at a remote location to enable access to inaccessible areas or surfaces.

* * * * *